Figure 1:
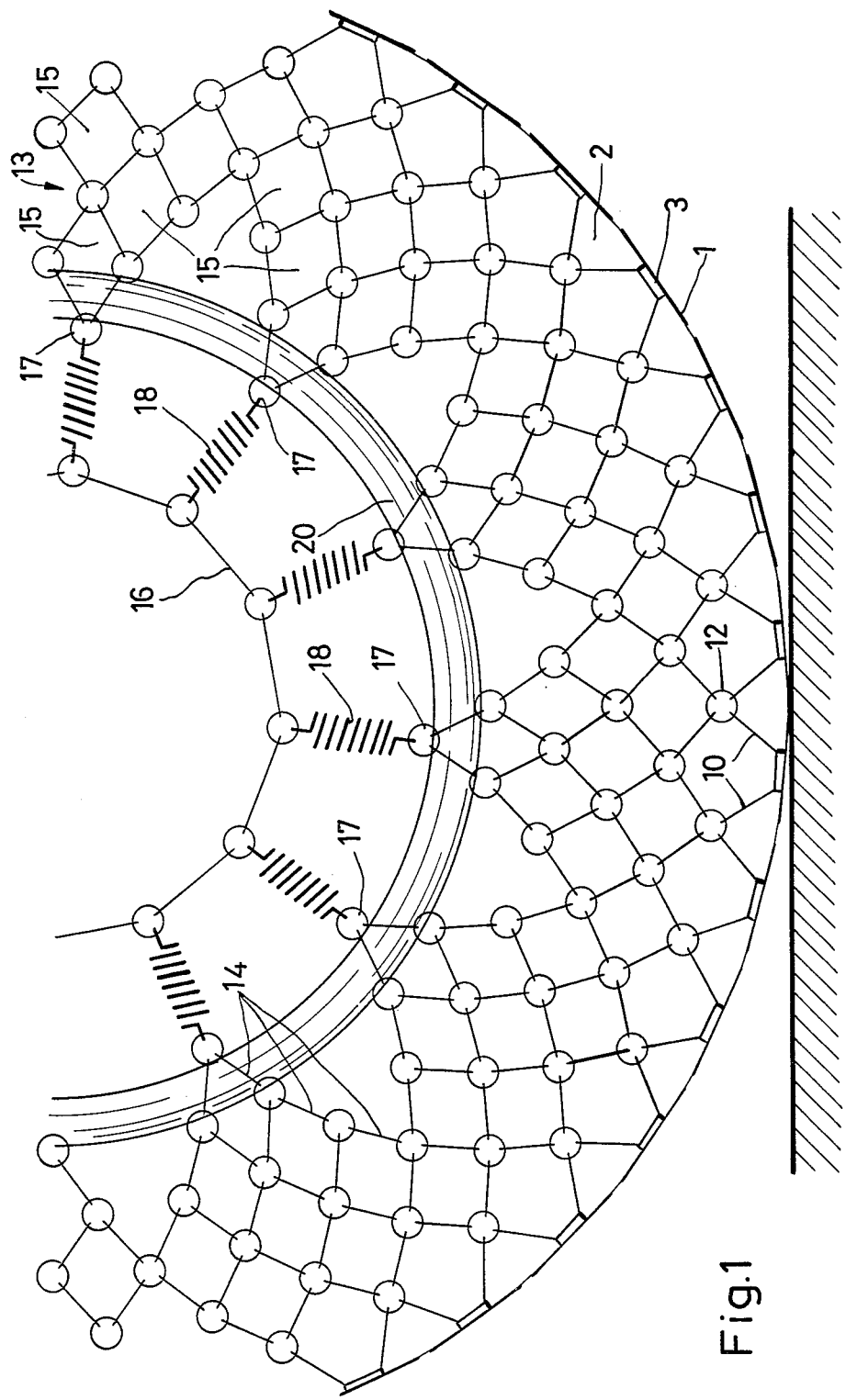

United States Patent [19]

Rieger et al.

[11] 4,215,733

[45] Aug. 5, 1980

[54] TIRE PROTECTOR DEVICE

[76] Inventors: Hansjörg Rieger, Saarstrasse 48, Aalen, Fed. Rep. of Germany, 7080; Erhard Weidler, Jahnstrasse 32, Aalen-Unterkochen, Fed. Rep. of Germany, 7084

[21] Appl. No.: 847,702

[22] Filed: Nov. 2, 1977

[30] Foreign Application Priority Data

Nov. 5, 1976 [DE] Fed. Rep. of Germany ....... 2651162
Nov. 5, 1976 [DE] Fed. Rep. of Germany ....... 2651163

[51] Int. Cl.² .............................................. B60C 27/20
[52] U.S. Cl. .................... 152/171; 152/173; 152/218; 152/223; 152/190
[58] Field of Search .............. 152/167, 170, 173, 174, 152/175, 177–184, 187, 190, 191, 217, 218, 219, 223, 225–228, 239–244

[56] References Cited

U.S. PATENT DOCUMENTS

| 828,641 | 8/1906 | Clifford | 152/178 |
| 958,053 | 5/1910 | Wilmes | 152/218 |
| 1,190,816 | 7/1916 | Thompson | 152/239 |
| 1,285,993 | 11/1918 | Hartfiel | 152/177 |
| 1,342,753 | 6/1920 | McGeorge | 152/217 X |
| 1,424,524 | 8/1922 | Seavey | 152/184 |

FOREIGN PATENT DOCUMENTS

| 2159826 | 6/1973 | Fed. Rep. of Germany | 152/239 |
| 20650 | 7/1918 | France | 152/223 |
| 500608 | 3/1920 | France | 152/191 |
| 792645 | 1/1936 | France | 152/223 |
| 7443 | of 1911 | United Kingdom | 152/173 |
| 248621 | 3/1926 | United Kingdom | 152/218 |

Primary Examiner—John J. Love
Attorney, Agent, or Firm—Parmelee, Johnson, Bollinger & Bramblett

[57] ABSTRACT

A tire protector device with a covering, especially formed by plates, which exhibits at its ends next to the outside of the tire connector parts for fastening a chain net which covers the side wall of the tire. The edge of said chain net remote from the connector parts being connected to a holding strand via connection parts which are formed of tension devices which have at least one tension spring forming a store of tensional force and/or which exhibit each a connector member carried movably on the holding strand.

6 Claims, 17 Drawing Figures

TIRE PROTECTOR DEVICE

The invention refers to a tire protector device with a covering which is used for protection of the tread of a tire and secured against shifting transversely to the tread, and which exhibits at its ends next to the outside of the tire connector parts for fastening a chain net which covers the sidewall of the tire and which is formed of chain links arranged in the form of polygons and at its edge remote from the connector parts is connected via radialy directed connection parts by a holding strand.

A tire protector device of the foregoing kind is known, which consists of plates lying loosely on the tire and connected together flexibly to form the covering, and chain nets arranged at opposite sides of the tire. The known device has the form of a tire protector chain which can be pulled onto the tire. Its connection parts which connect the chain nets with an inner chain are formed of one vertical link in each case. The known construction is not capable of being completely satisfactory when because of a relatively low air pressure in the tire and/or in the case of high loading of the tire severe flattening of the tire occurs, to which the chain net cannot adequately adapt itself. The consequence in such cases is breakdown of individual links of the chain and the tire protector device becoming unusable. The danger indicated is particularly great if between the tire and the tire protector device scarcely any or no slip is possible, i.e. the covering is, for example, connected to the tire.

The object of the invention is to create a tire protector device of the kind initially described, which works correctly even with the tire in service at relatively low air-pressure and under heavy loads and even in the case of the employment of a covering of plates connected to the tire.

This problem is in accordance with the invention solved if the connection parts are formed of tension devices which have at least one tension spring forming a store of tensional force and/or that the connection parts exhibit each of a connector member which is carried movably on the holding strand.

The tire protector device in accordance with the invention allows through the tension devices and their radial arrangement and/or through the movable arrangement of the connector members on the holding strand, adaptation of the chain net to the flattened shape of the tire to be achieved in the region of the area of contact of the tire. Shiftings of the links in the chain net thereby get equalised and its safety against breakage perceptibly increased.

It is particularly advantageous if the edge of the chain net next to the holding strand exhibits parts of the net of in each case at least three polygons and which taper in like a roof. In the case of a device of the last-mentioned kind not only does one get away with a relatively small number of tension devices or connector members respectively, but furthermore a particularly high degree of flexibility is obtained in the chain net.

Figure 2:
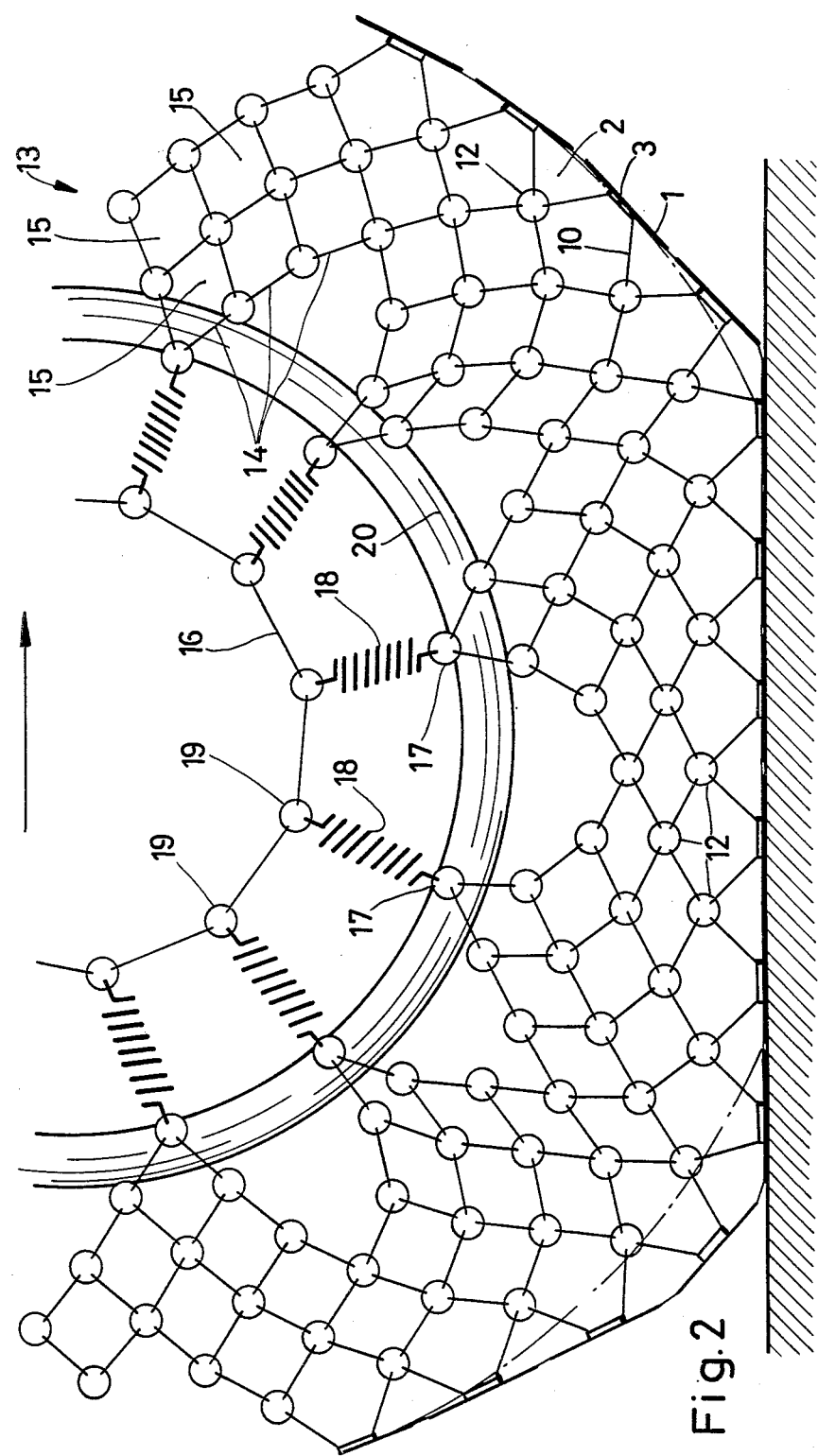
Figure 3:
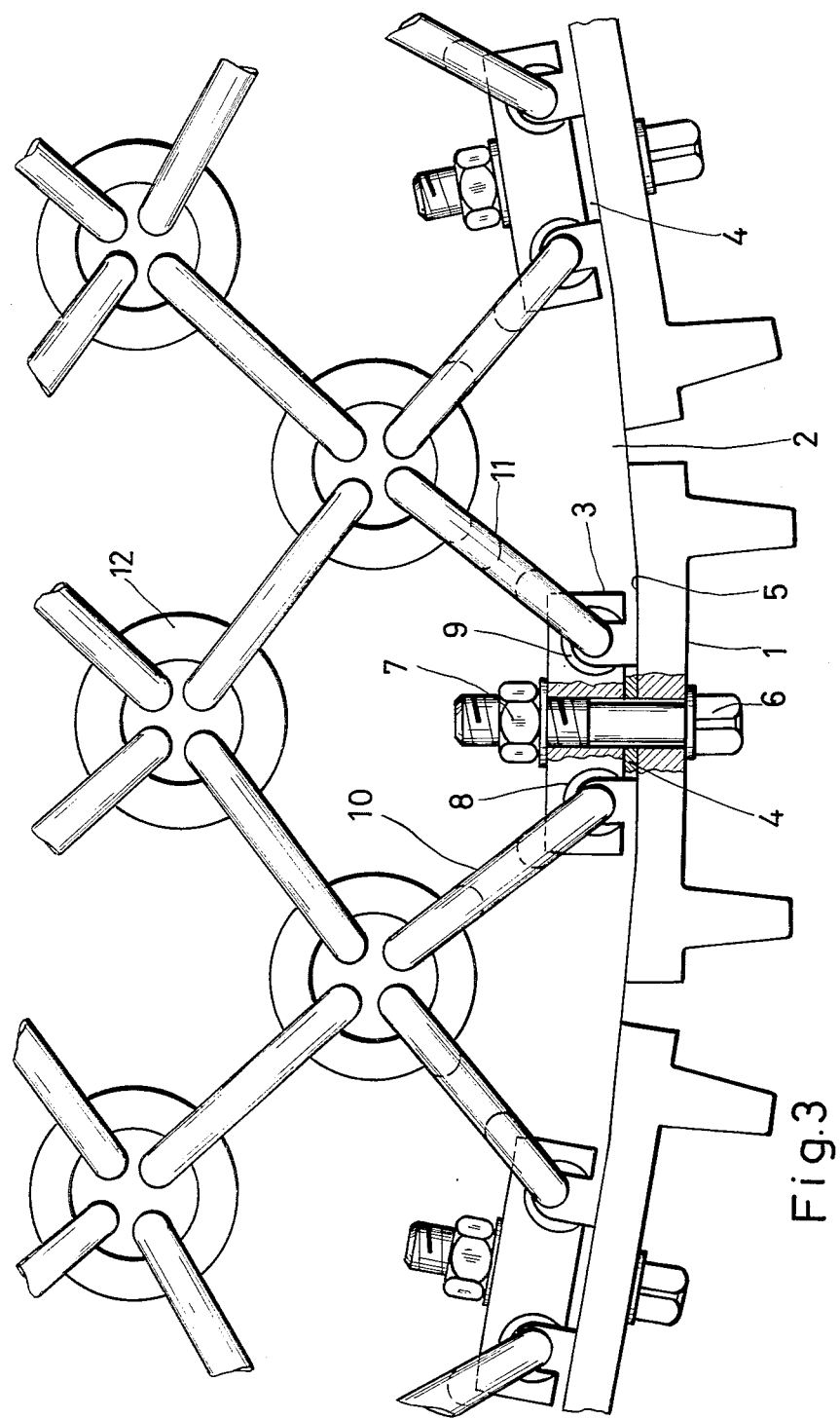
Figures 4, 5:
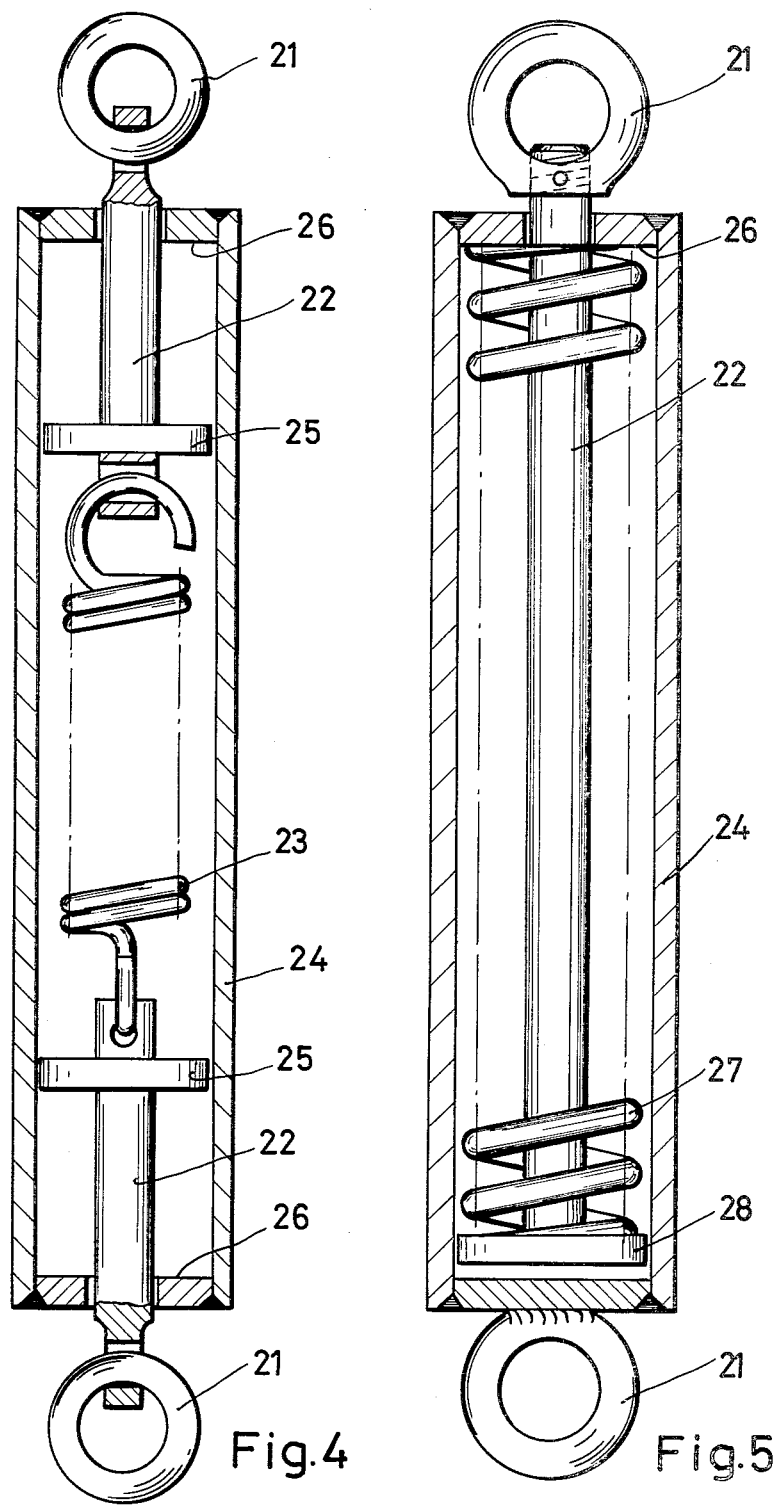
Figure 6:
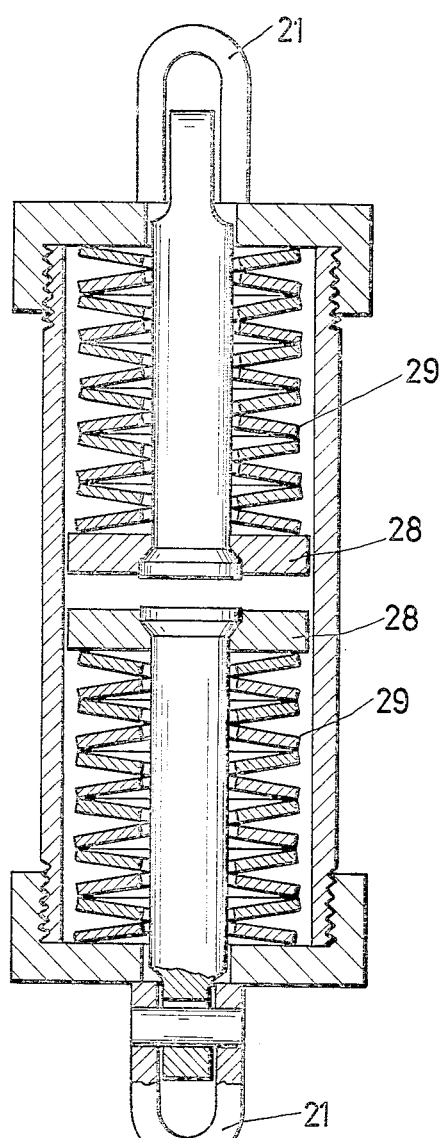
Figure 7:
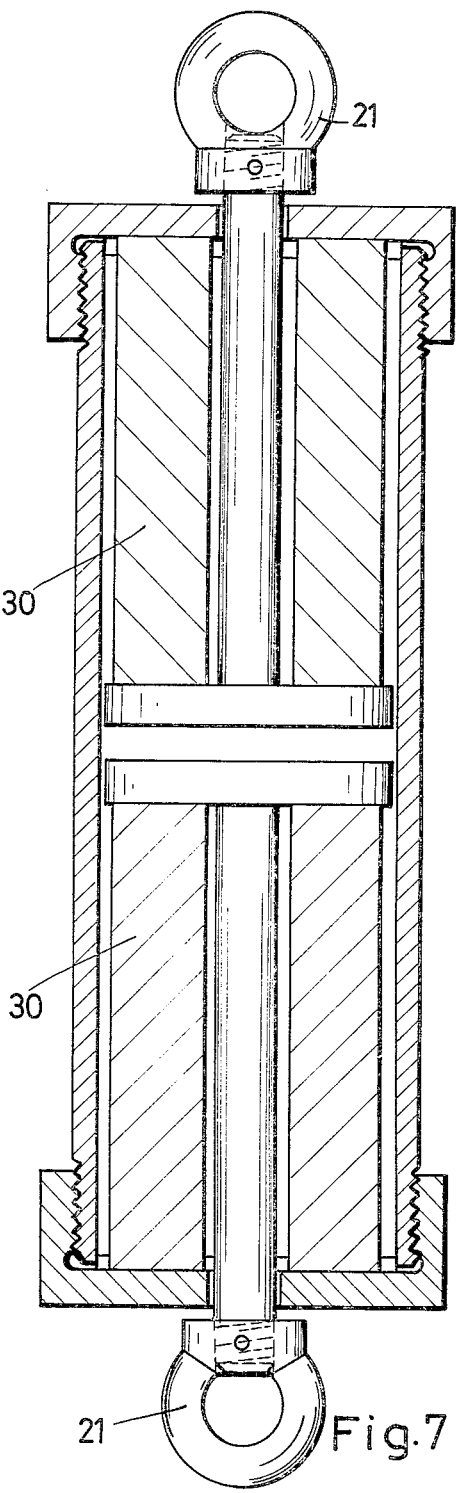
Figures 8, 9:
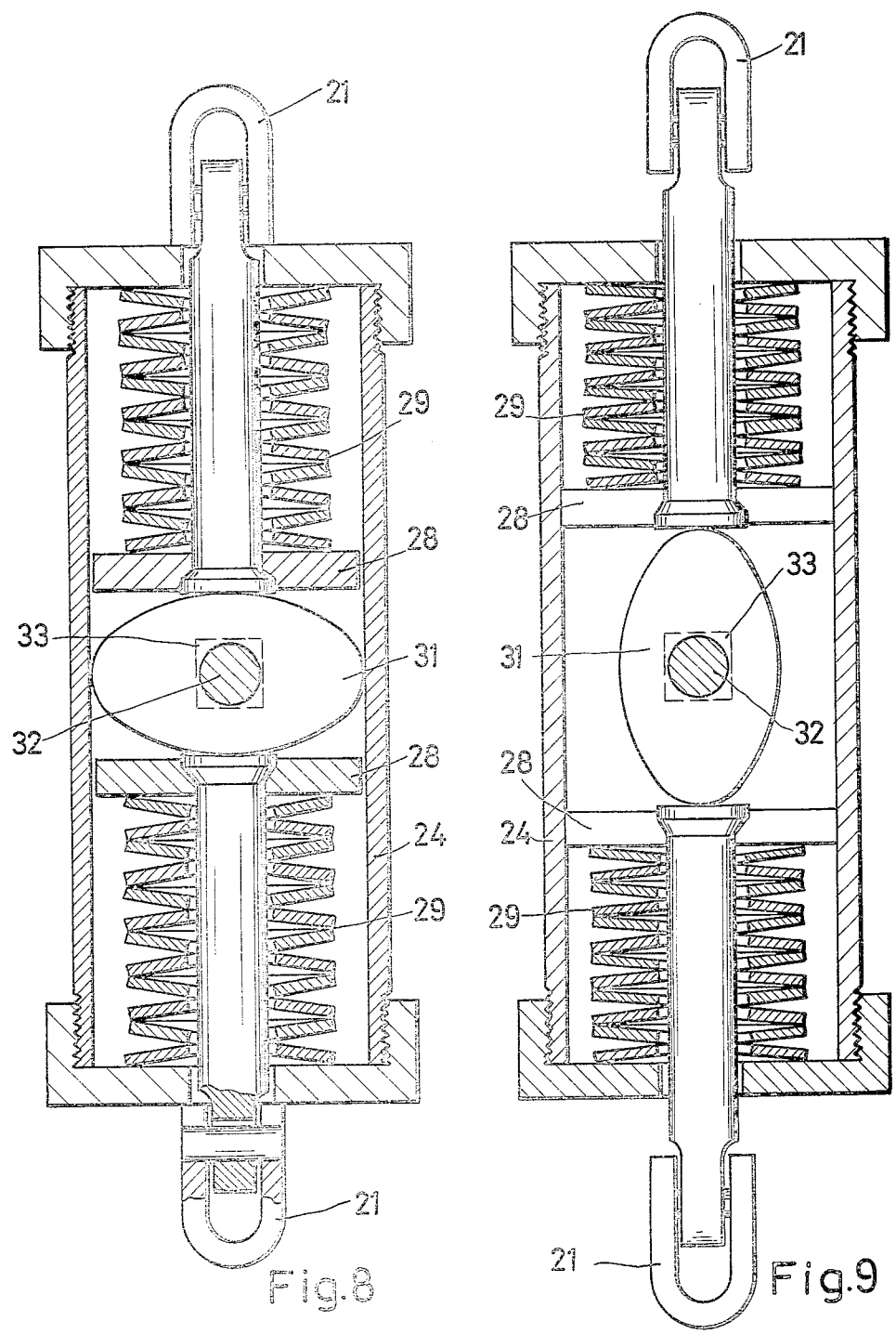
Figure 10:
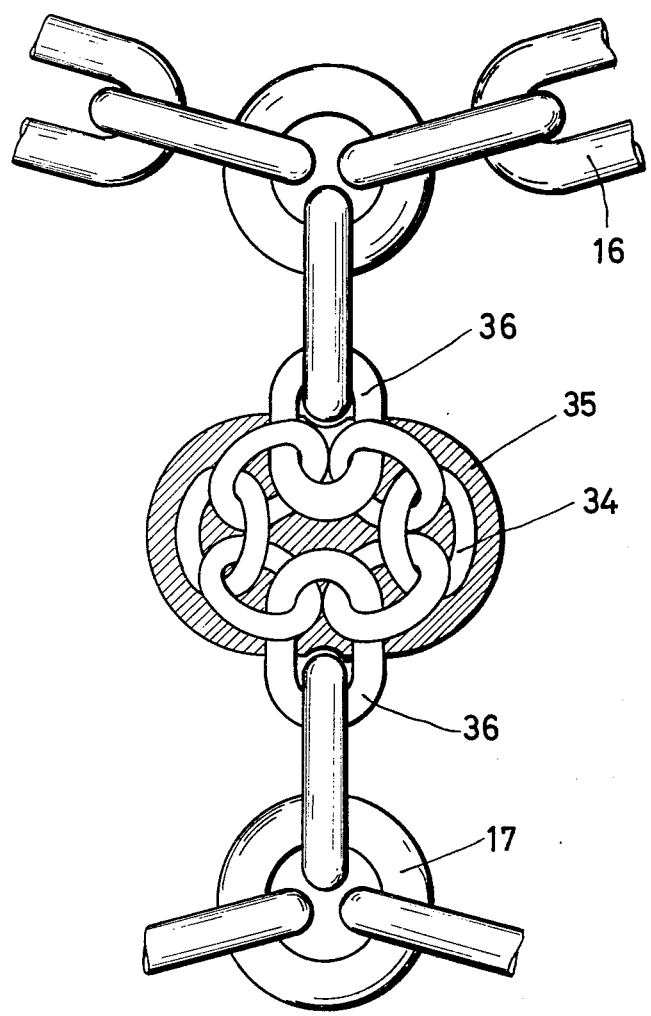
Figure 11:
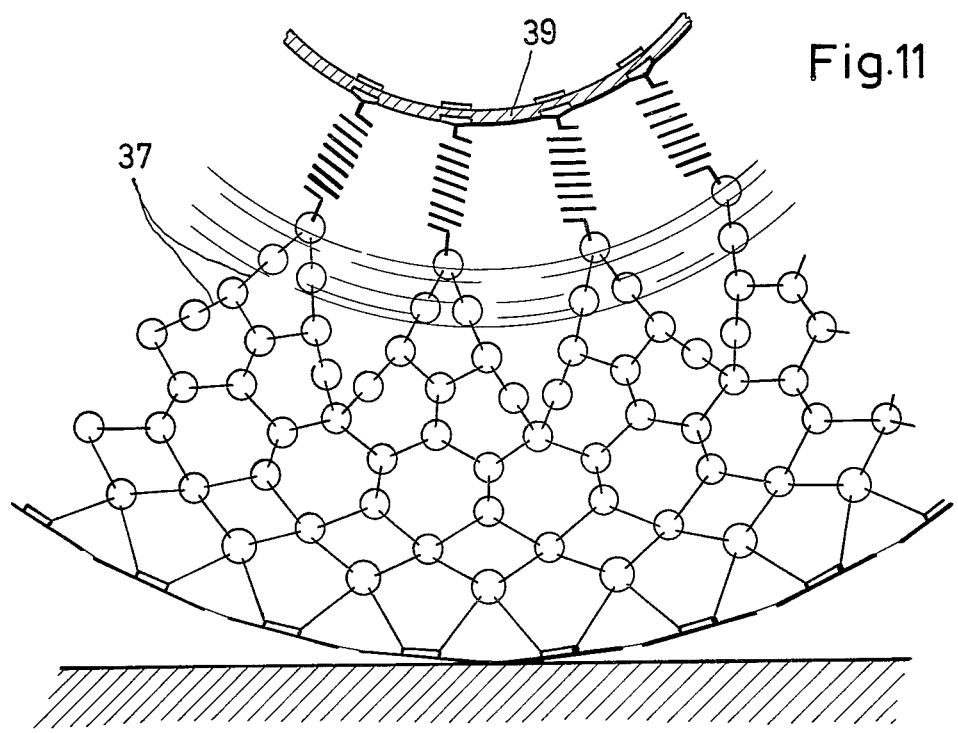
Figure 12:
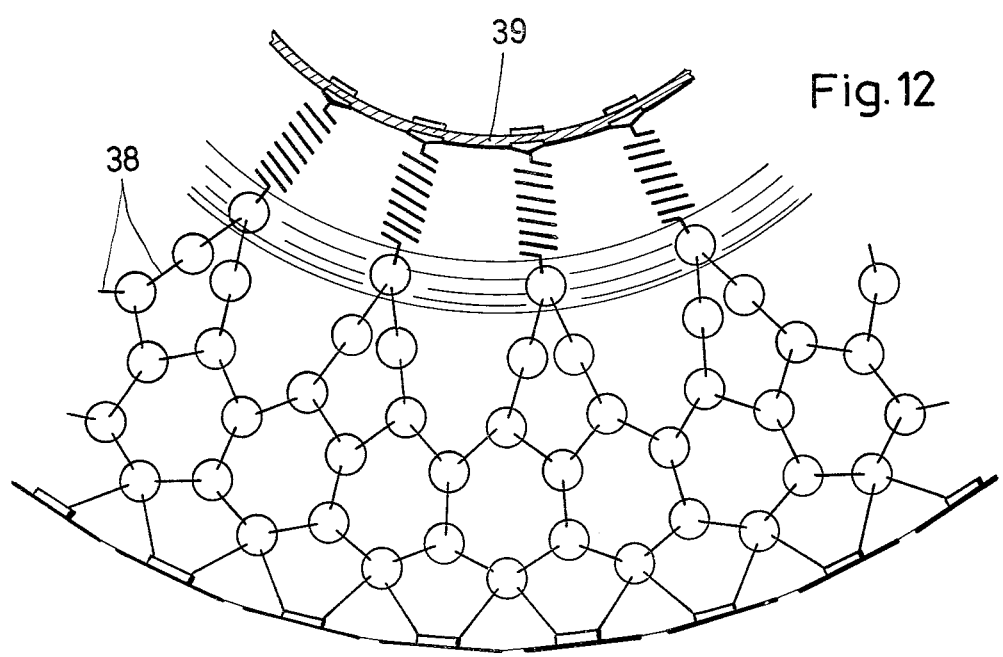
Figure 13:
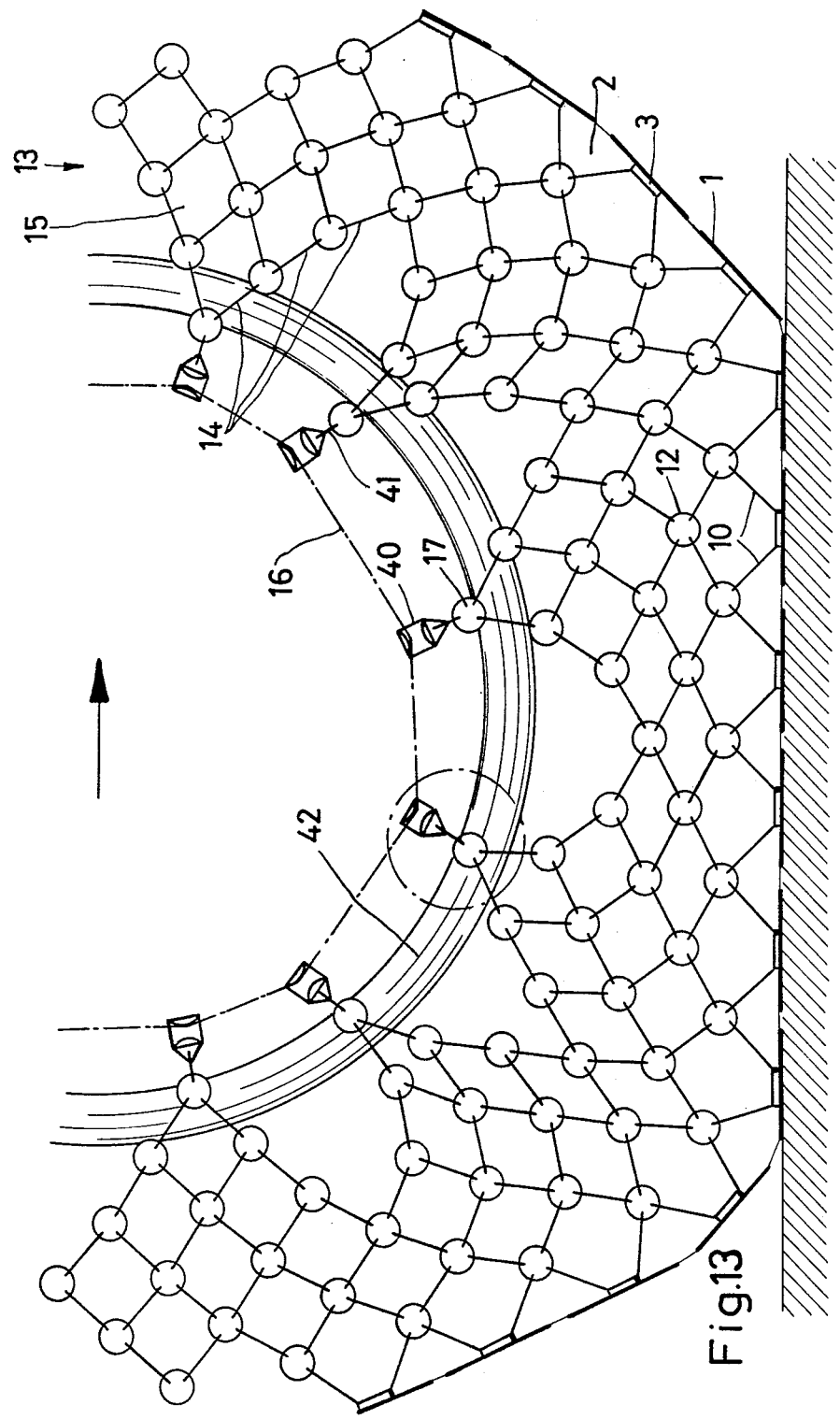
Figure 14:
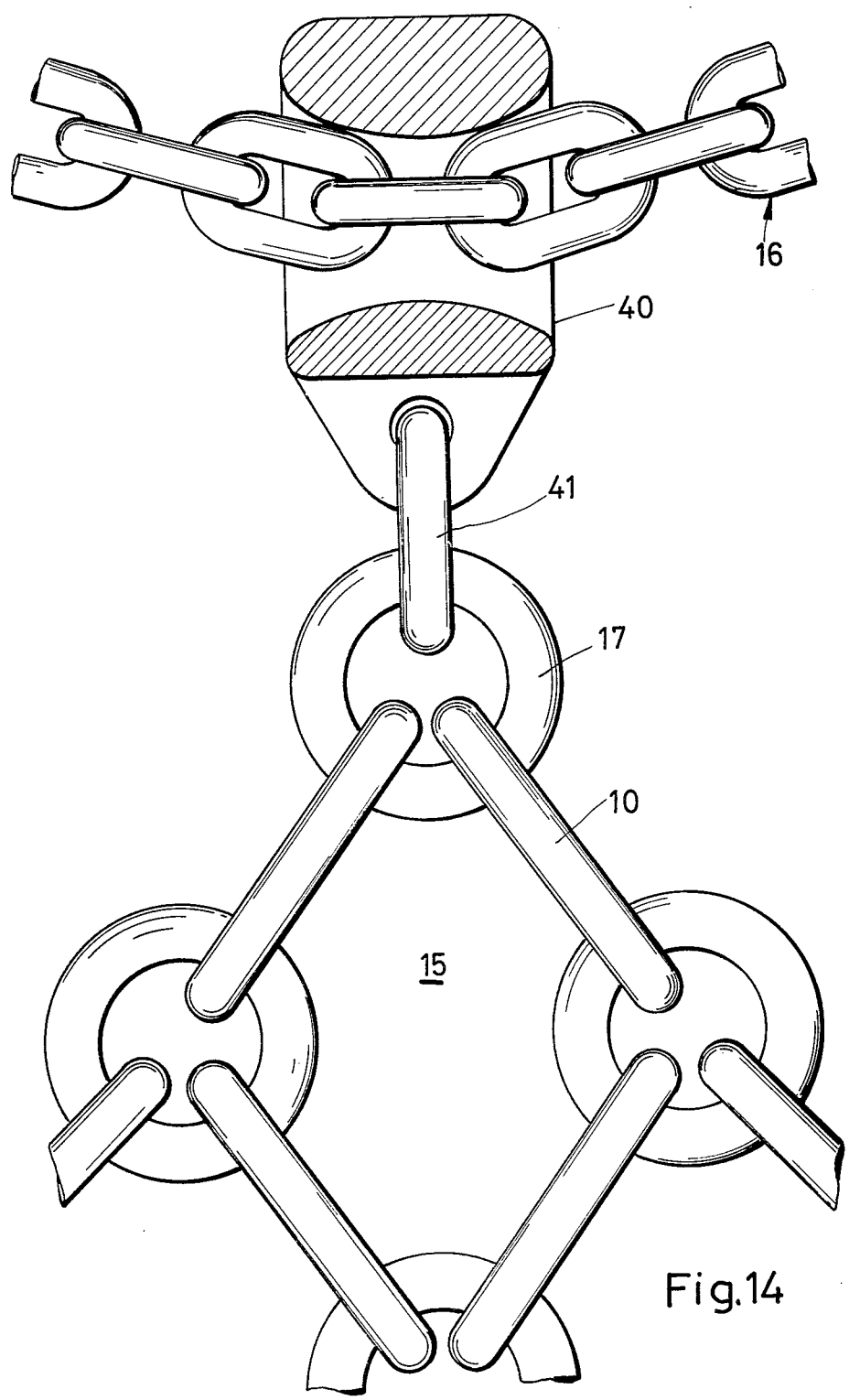
Figure 15:
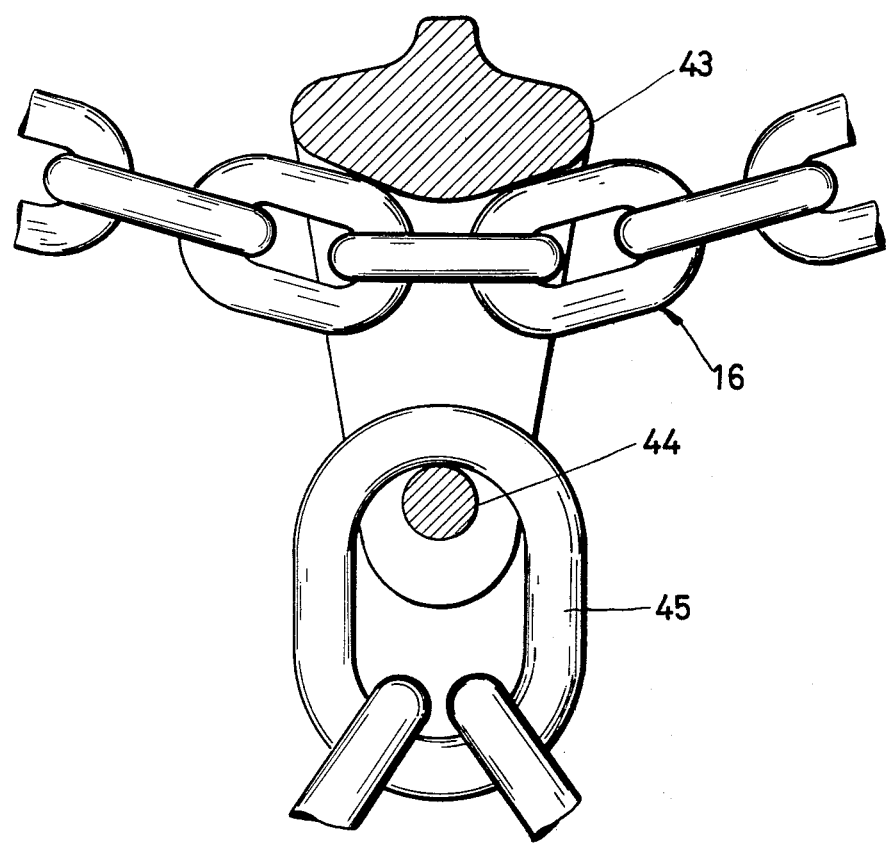
Figure 16:
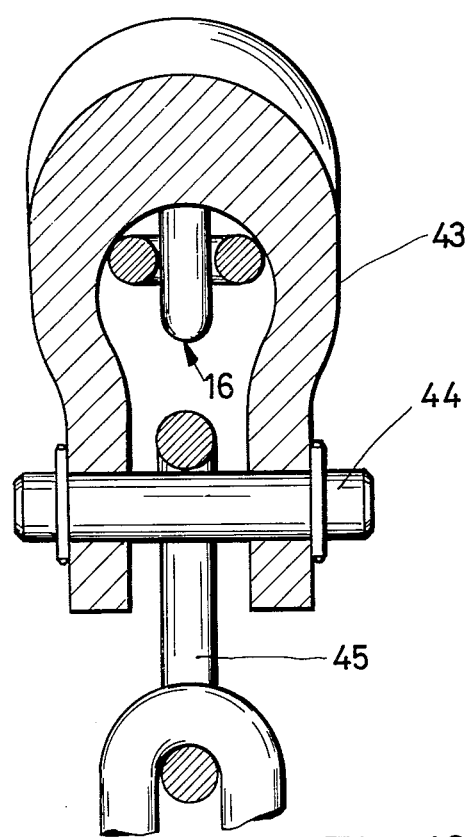
Figure 17:
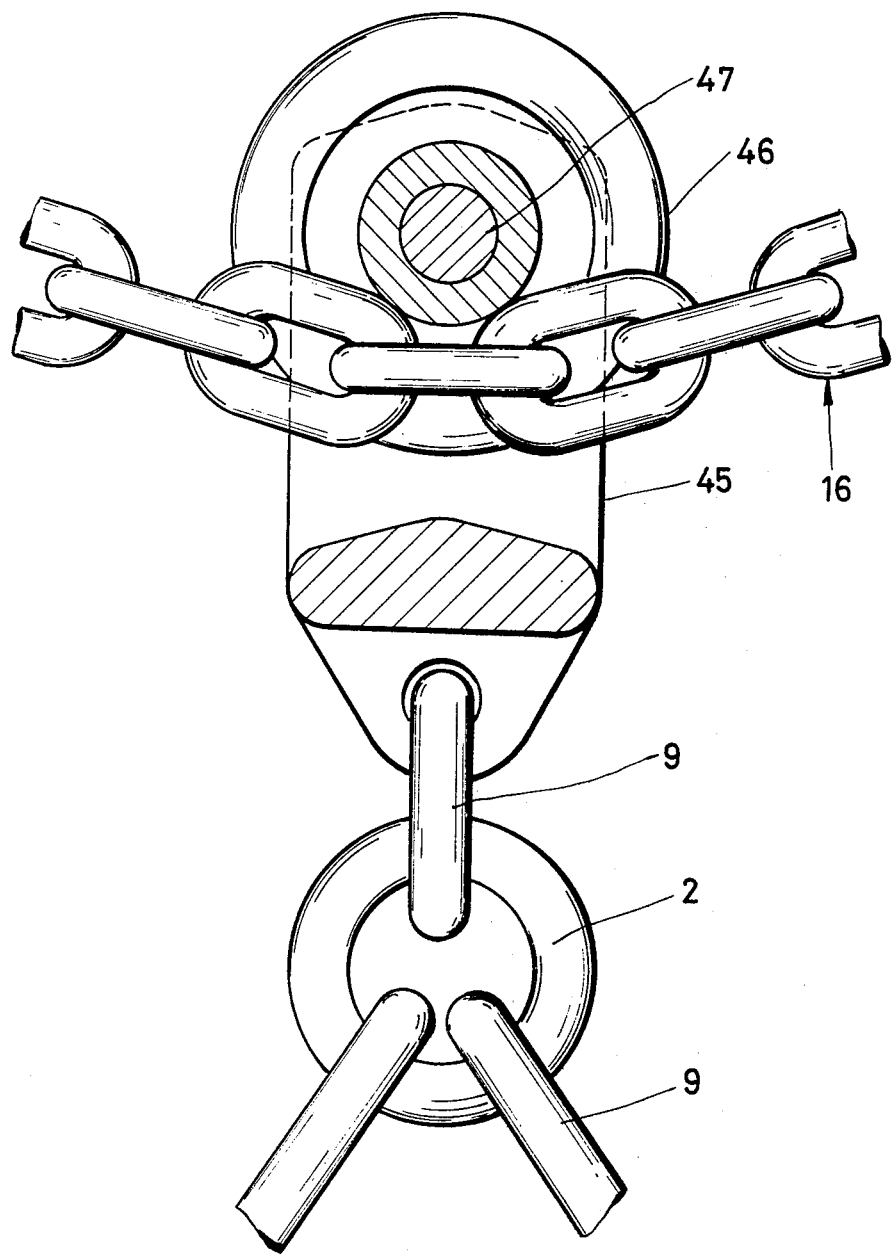

The invention is explained in greater detail below with the aid of the attached drawings. There is shown in:

FIG. 1—the side elevation of part of a tire protector device with tension devices, pulled onto a tire and with the tire unloaded;

FIG. 2—a side elevation corresponding with FIG. 1, which shows the tire protector device with the tire flattened under load;

FIG. 3—the kind of fastening of the chain net to the plates of the tire protector device in accordance with FIGS. 1 and 2;

FIG. 4—a tension device with a tension spring;

FIG. 5—a tension device with a compression spring;

FIG. 6—a tension device with two sets of cup springs;

FIG. 7—a tension device with two rubber springs;

FIG. 8—a tension device with a tension member in the unloaded state of the spring;

FIG. 9—the tension device in accordance with FIG. 8 in the prestressed state;

FIG. 10—a further tension device;

FIGS. 11 and 12—chain nets of modified net configuration;

FIG. 13—the side elevation of part of a tire protector device with connector members carried movably on the holding strand, pulled onto a tire and with the tire flattened under load;

FIG. 14—partly in section a slide collar carried on an inner chain, of the tire protector device in accordance with FIG. 13, on an enlarged scale;

FIG. 15—partly in section a slide stirrup carried on an inner chain;

FIG. 16—the slide stirrup in accordance with FIG. 15 considered in another plane of section; and FIG. 17—partly in section a roller stirrup carried on an inner chain.

In FIGS. 1-3 the reference 1 indicates the plates of a tire protector device, which are connected firmly to a tire 2, holding flaps (not shown) vulcanised into the tire being used for the firm connection. The plates 1 as appears from FIG. 3 are provided with connector stirrups 3 which are supported via spacer washers 4 from the underside 5 of the plates 1. A bolt 6 and nut 7 are used for fastening the connector stirrups. Each connector stirrup 3 is provided with two guide-troughs 8 and 9 in each of which is suspended a vertical link 10 arranged essentially perpendicular to the sideface. It is advisable to employ at least as connector links vertical links with a central web 11.

The oval vertical links 10 and the circular horizontal links 12 form a chain net designated generally by 13, which has net parts 14 tapering in like a roof, of a number of quadrants 15. The peaks 17 of the net parts 14 next the inner chain 16 of the chain net 13 are connected via tension devices 18 to the inner chain 16. The tension devices in the case of the embodiment in accordance with FIGS. 1 and 2 are formed of spiral springs. As comparison of FIG. 1 with FIG. 2 reveals, the distance between every two adjacent peaks increases in the region of the flattening of the tire. At the same time considerable alterations in length occur between the points of connection 19 to the inner chain 16 and the peaks 17 of the net parts 14, which particularly as the plates leave or respectively arrive at the area of contact would lead to jerky loadings if they were not equalised by the tension devices 18. The roof-like form of the net parts 14 moreover facilitates shifting of the links of the chain net 13 in a tangential direction. The displacements to be equalised by the tension devices in the case of a tire protector device for a tire with a diameter of 2200 mm are of the order of magnitude of 80–100 mm.

The distance of the tension devices 18 from the plates 1 should be big enough for them to lie respectively with the chain net 13 mounted, inside the circle bounded by the wheel flange 20. Their arrangement at this point offers a far higher protection against wear and damage than an arrangement in the region of the sidewalls of the tire 2.

In FIGS. 4–10 tension devices of different types of construction are illustrated.

FIG. 4 shows a tension device which has two connector eyes 21 which are fastened to the ends of rods 22. Into the ends of the rods 22 remote from the connector eyes 21 a tension spring 23 is suspended. The tension spring 23 is surrounded by a guide cylinder 24 in which the rods 22 are supported by guiderings 25. In mounting the tension device illustrated in FIG. 4 the tension spring is extended until the guiderings 25 come to rest against stops 26 formed by the ends of the guide cylinder 24.

FIG. 5 shows a tension device with a tension spring 27 made as a compression spring. For parts which correspond with the parts of the tension device in accordance with FIG. 4 the same reference numbers have been used. This embodiment too has two connector eyes 21, one of which is fastened to a rod 22 and one to the guide cylinder 24. The compression spring 27 is in this case arranged between a stop 26 and a spring plate 28 which at the same time acts as the guide to the rod 22.

Instead of a spiral spring 27 compression springs 29 may also be employed which are formed of stacks of cup springs as shown in FIG. 6. With cup springs it is most easily possible to achieve particularly favourable spring characteristics.

A construction which corresponds largely with the construction in accordance with FIG. 6 is shown in FIG. 7. Here compression springs 30 of rubber are employed.

A particularly advantageous tension device is illustrated in FIGS. 8 and 9. Its construction certainly largely corresponds with the tension device in accordance with FIG. 6, but with the difference from that tension device that here a strain cam 31 is provided. The strain cam 31 has a swivel pin 32 which projects out of the guide cylinder 24 with a square or hexagon head 33 and hence is accessible from outside. The strain cam 31 facilitates mounting of the chain considerably. Before mounting the tension devices it is carried over into the position shown in FIG. 9. Then the tension devices are suspended at the points provided for them, which appear from FIG. 1 and 2.

After the chain net has been pre-mounted in this way the swivel pins 32 and the strain cams 31 are turned back into the position indicated in FIG. 8. The result is a uniform automatic tensioning of the chain net under the action of the compression springs 29. It goes without saying that in the tensioned state of the chain net there exists between the spring plates 28 and the strain cam 31 a clearance. During the pre-mounting the inner chain 16 may be open or get shortened respectively, though during the actual tensioning process it must be closed.

FIG. 10 shows a tension device which is formed of a ring 34 of links of chain, the links of which in the unstressed state are embedded loosely in an elastic body 35. 36 are two connector links which project out of the body.

Modified configurations of the net are illustrated in FIGS. 11 and 12. The modified embodiments too have net parts 37 and 38 respectively, which taper in like roofs and which like the preferred net parts 14 enable equalising movements of the chain nets with deformations of the tires. Whilst in the case of the constructions previously described the holding strand is formed of an inner chain, in the case of the solutions in accordance with FIG. 11 and 12 a rope 39 is used as the holding strand.

In FIG. 13 the reference 1 indicates once again the plates of a tyre protector device, which are connected firmly to a tire 2, holding flaps (not shown) vulcanised into the tyre being used for the firm connection. The plates 1 are as shown in FIG. 3 provided with connector stirrups 3 which are supported via spacer washers 4 from the underside 5 of the plates 1. A bolt 6 and nut 7 are used for fastening each of the connector stirrups. Each connector stirrup 3 is provided with two guidetroughs 8 and 9 in each of which is suspended a vertical link 10 arranged essentially perpendicular to the sideface.

The vertical links 10 and the circular horizontal links 12 form a chain net designated generally by 13, which has net parts 14 tapering in like a roof, of a number of quadrants 15. The peaks 17 of the net parts 14 next the inner chain 16 of the chain net 13 are connected by means of slide collars 40 to the inner chain 16 which in certain cases may be formed of a rope. As may readily be seen, the distances between the peaks 17 in the region of the flattening of the tire are greater than in the undeformed region of the tire. The slide collars 40 can adapt themselves on the inner chain 16 to these different distances. In this way it is avoided that as the plates leave or respectively arrive at the area of contact jerky loadings arise, which could lead to rupture of the chain net. The roof-like form of the net parts 14 facilitates shifting of the links of the chain net 13 in a tangential direction.

In the embodiment illustrated the slide collars 40 are connected each via an intermediate link 41 to the sidechains. The distance of the slide collars 40 from the plates is moreover big enough for them to lie respectively with the chain net 13 mounted, inside the circle bounded by the wheel flange 20. Their arrangement at this point offers a far higher protection against wear and damage than an arrangement in the region of the sidewalls of the damage than an arrangement in the region of the sidewalls of the tire 2.

In order that the slide collar 40 may slide correctly along the inner chain 16 its width must be greater than twice the pitch of the chain links of the inner chain 16. Also the rounding off of the corners of the inner faces of the slide collar and its radius of curvature must not fall below a certain value if catching of the slide collar is to be excluded.

Instead of a slide collar 40 a shackle-shaped slide stirrup 43 may also be employed as the connector member, as is illustrated in FIGS. 15 and 16. An intermediate link is in this case superfluous, since by means of a pin 44 the peak of each roofshaped net part, formed by an oval horizontal link 45 can be connected directly to the slide stirrup 43. A connector member made as a roller stirrup 45 is shown in FIG. 17. Here the inner chain 16 is carried by a roller 46 which is supported on a pin 47. It goes without saying that in all the cases described, instead of the inner chain 16 a holding strand formed of a rope 39 may be made use of. The guarantee is always provided that the chain net can perform those equalising movements necessary because of the deformations of the tyre which occur, which may be regarded as a kind of "breathing movement" of the quadrants 15.

We claim:

1. A tire protector device for mounting on a tire and wheel flange adjacent thereto including:
   a cover for protecting tire tread of said tire, said cover positioned in proximity to said tire tread;
   a chain net for covering the outer side wall of said tire, said chain net comprising chain links arranged together to form a plurality of polygons;
   first means for connecting said chain net to said cover, said first means being positioned between said cover and said chain net;
   a holding strand;
   second means for connecting said chain net to said holding strand for enabling and equalizing the displacement of said chain net resulting from the deformation of said tire, said second means being positioned between said holding strand and said chain net;
   said second means comprising at least one device including at least one compression spring for storing compressional forces, said device being positioned in a radial direction towards the center of said tire;
   said device including two rods and two connector eyes mounted to the outer ends of said two rods, two compression springs surrounding said two rods respectively, a strain cam positioned between said two rods for connecting the inner ends of said two rods, and stop means associated with said two rods such that said two rods are movable with respect to said stop means against the action of said compression springs.

2. A tire protector device for mounting on a tire and wheel flange adjacent thereto including:
   a cover for protecting tire tread of said tire, said cover positioned in proximity to said tire tread,
   a chain net for covering the outer side wall of said tire, said chain net comprising chain links arranged together to form a plurality of polygons;
   first means for connecting said chain net to said cover, said first means being positioned between said cover and said chain net;
   a holding strand;
   second means for connecting said chain net to said holding strand for enabling and equalizing the displacement of said chain net resulting from the deformation of said tire, said second means being positioned between said holding strand and said chain net;
   said second means comprising at least one tension device including at least one tension spring for storing tensional force, said tension drive being positioned in a radial direction towards the center of said tire;
   said tension device including two rods and two connector eyes mounted to the outer ends of said two rods, said tension spring being interposed between said two rods for connecting the inner ends of said two rods, and stop means associated with each of said two rods such that said two rods are movable with respect to said stop means against the action of said tension spring.

3. A protector device as claimed in claim 1 further including a swivel pin associated with said strain cam, said swivel pin being accessible from the outside of said device.

4. In an improved tire protector device for mounting on a tire and wheel flange adjacent thereto of the type including:
   a cover for protecting tire tread of said tire, said cover positioned in proximity to said tire tread;
   a chain net for covering the outer side wall of said tire, said chain net comprising chain links arranged together to form a plurality of polygons;
   first means for connecting said chain net to said cover, said first means being positioned between said cover and said chain net;
   a holding strand;
   second means for connecting said chain net to said holding strand for enabling and equalizing the displacement of said chain net resulting from the deformation of said tire, said second means being positioned between said holding strand and said chain net;
   said second means comprising at least one device including at least one compression spring for storing compressional forces, said device being positioned in a radial direction towards the center of said tire;
   the improvement comprising:
   said device including two rods and two connector eyes mounted to the outer ends of said two rods, two compression springs surrounding said two rods respectively, a strain cam positioned between said two rods for connecting the inner ends of said two rods, and stop means associated with said two rods such that said two rods are movable with respect to said stop means against the action of said compression springs.

5. In an improved tire protector device for mounting on a tire and wheel flange adjacent thereto of the type including:
   a cover for protecting tire tread of said tire, said cover positioned in proximity to said tire tread;
   a chain net for covering the outer side wall of said tire, said chain net comprising chain links arranged together to form a plurality of polygons;
   first means for connecting said chain net to said cover, said first means being positioned between said cover and said chain net;
   a holding strand;
   second means for connecting said chain net to said holding strand for enabling and equalizing the displacement of said chain net resulting from the deformation of said tire, said second means being positioned between said holding strand and said chain net;
   said second means comprising at least one tension device including at least one tension spring for storing tensional force, said tension device being positioned in a radial direction towards the center of said tire;
   the improvement comprising:
   said tension device including two rods and two connector eyes mounted to the outer ends of the two rods, said tension spring being interposed between said two rods for connecting the inner ends of said two rods, and stop means associated with each of said two rods such that said two rods are movable with respect to said stop means against the action of said tension spring.

6. A protector device as claimed in claim 4 further including a swivel pin associated with said strain cam, said swivel pin being accessible from the outside of said device.

* * * * *